(12) United States Patent
Budzyn et al.

(10) Patent No.: US 9,296,952 B2
(45) Date of Patent: Mar. 29, 2016

(54) RUBBER GRANULATE CONVERSION PROCESS FOR PRODUCING A SEMI-ACTIVE CARBONIZED SUBSTANCE AND A PLASTICIZER

(75) Inventors: Stanislaw Budzyn, Cracovie (PL); Victor Iwanicki, Varsovie (PL); Andrzej Sumara, Recz (PL); Wieslaw Zmuda, Cracovie (PL); Christian D'Emal, Magny le Hongre (FR)

(73) Assignee: ALFYMA INDUSTRIE, Bailly-Romainvilliers (FR)

( * ) Notice: Subject to any disclaimer, the term of this patent is extended or adjusted under 35 U.S.C. 154(b) by 803 days.

(21) Appl. No.: 13/376,135

(22) PCT Filed: Jun. 1, 2010

(86) PCT No.: PCT/FR2010/051055
§ 371 (c)(1),
(2), (4) Date: Feb. 21, 2012

(87) PCT Pub. No.: WO2010/139888
PCT Pub. Date: Dec. 9, 2010

(65) Prior Publication Data
US 2012/0136112 A1    May 31, 2012

(30) Foreign Application Priority Data
Jun. 2, 2009 (FR) ..................... 09 53628

(51) Int. Cl.
| C08J 11/14 | (2006.01) |
| C10B 53/07 | (2006.01) |
| B82Y 30/00 | (2011.01) |
| C09C 1/48 | (2006.01) |
| C10B 47/18 | (2006.01) |
| C10G 1/10 | (2006.01) |

(52) U.S. Cl.
CPC .................. *C10B 53/07* (2013.01); *B82Y 30/00* (2013.01); *C08J 11/14* (2013.01); *C09C 1/482* (2013.01); *C10B 47/18* (2013.01); *C10G 1/10* (2013.01); *C01P 2004/32* (2013.01); *C01P 2004/62* (2013.01); *C01P 2004/64* (2013.01); *C01P 2006/12* (2013.01); *C01P 2006/19* (2013.01); *C10G 2300/1003* (2013.01); *C10G 2300/4006* (2013.01); *C10G 2300/4056* (2013.01); *C10G 2300/4081* (2013.01); *C10G 2300/805* (2013.01); *Y02P 20/143* (2015.11)

(58) Field of Classification Search
CPC .......... C10G 1/10; C10B 53/07; C10B 47/26; C10B 49/14; C08J 11/14
USPC ............................................ 521/45; 523/307
See application file for complete search history.

(56) References Cited

U.S. PATENT DOCUMENTS

| 4,126,519 | A | 11/1978 | Murray | |
| 5,229,099 | A | 7/1993 | Roy | |
| 5,780,518 | A * | 7/1998 | Mulyarchik et al. | ............ 521/45 |
| 6,777,453 | B1 * | 8/2004 | Matsushita et al. | ............. 521/45 |
| 7,166,658 | B2 * | 1/2007 | Harrison et al. | .............. 523/307 |

FOREIGN PATENT DOCUMENTS

| DE | 3523645 | 2/1987 |
| FR | 2402475 | 4/1979 |
| FR | 2721692 | 12/1995 |
| JP | 50-102676 | 8/1975 |
| JP | 56-41293 | 4/1981 |
| WO | WO 02/38658 | 5/2002 |

OTHER PUBLICATIONS

Int'l Search Report & Written Opinion issued in app. No. PCT/FR2010/051055 (2010).

* cited by examiner

*Primary Examiner* — Peter D Mulcahy
(74) *Attorney, Agent, or Firm* — Young & Thompson

(57) ABSTRACT

The present invention relates to a rubber granulate conversion process comprising steps consisting in: a) pyrolysing the rubber granulates at a temperature between 400 and 500° C. in the presence of water, to obtain a carbonized substance and a gaseous phase; and b) recovering the carbonized substance obtained during the previous step. The invention also relates to the products resulting from the conversion process and to the use of said products.

13 Claims, 1 Drawing Sheet

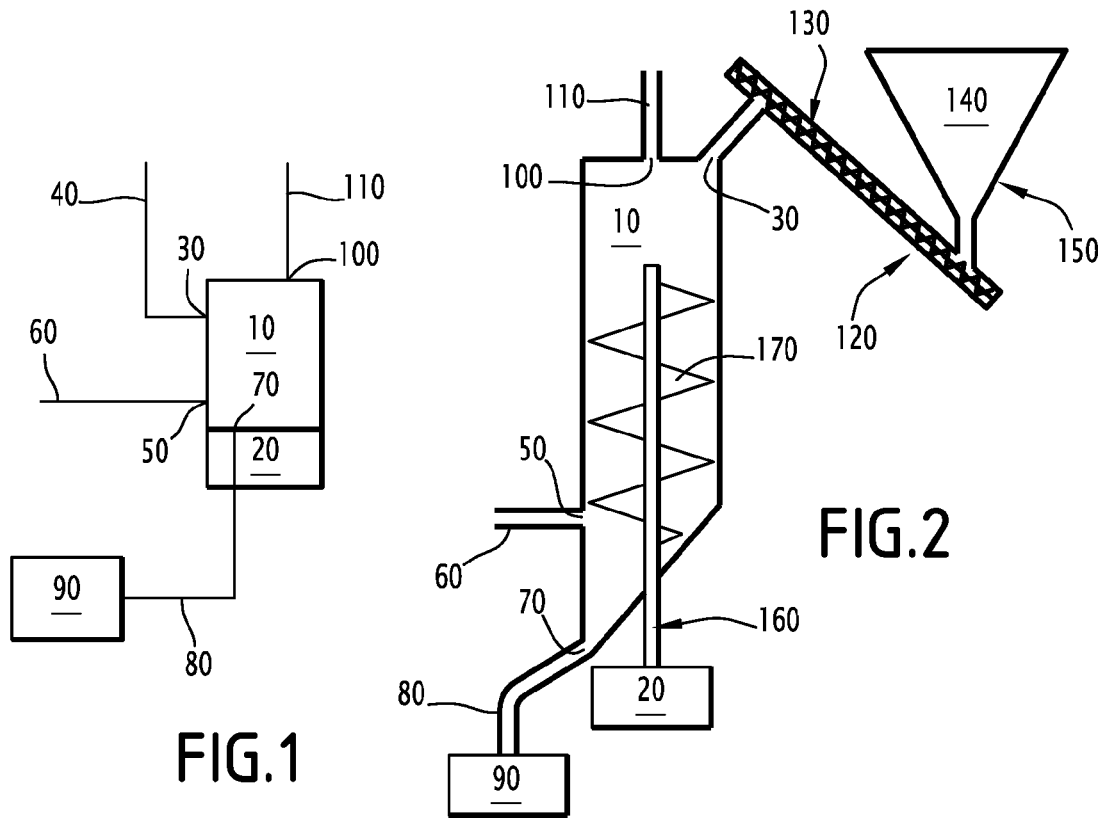
FIG.1
FIG.2
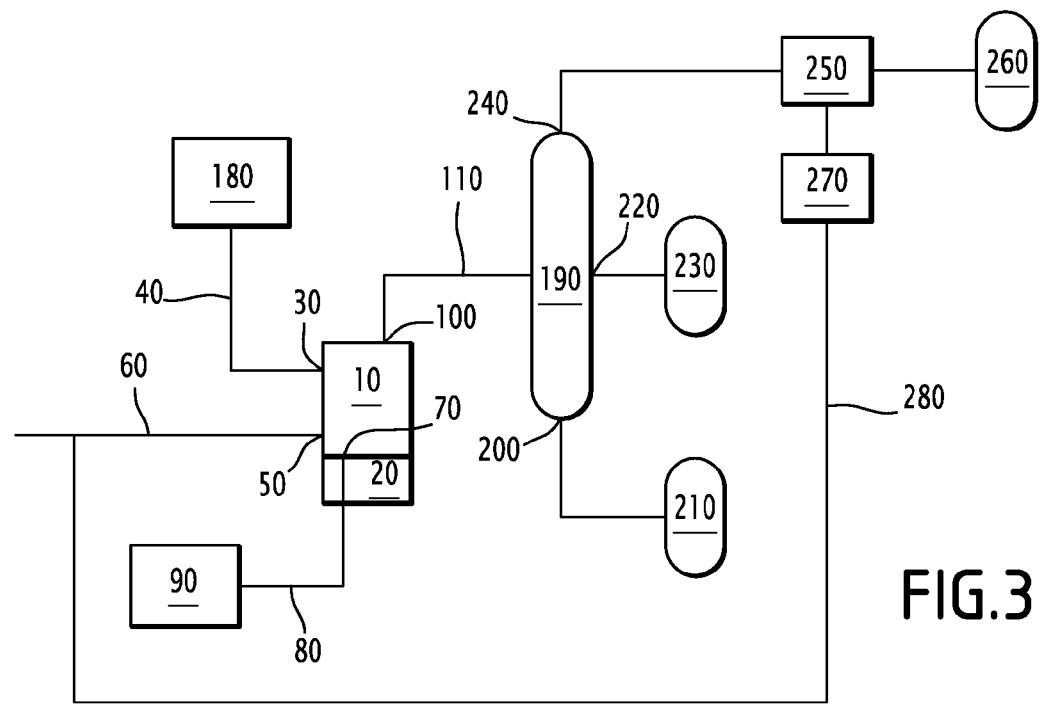
FIG.3

RUBBER GRANULATE CONVERSION PROCESS FOR PRODUCING A SEMI-ACTIVE CARBONIZED SUBSTANCE AND A PLASTICIZER

CROSS REFERENCE TO RELATED APPLICATIONS

This application is a U.S. nationalization under 35 U.S.C. §371 of International Application No. PCT/FR2010/051055, filed Jun. 1, 2010, which claims priority to French application no. FR0953628, filed Jun. 2, 2009. The disclosures set forth in the referenced applications are incorporated herein by reference in their entireties.

BACKGROUND OF THE INVENTION

1. Field of the Invention

The invention relates to a conversion process for rubber granulates, in particular resulting from shredding used tires, making it possible to produce a carbonized substance and possibly a plasticizer, which can be used in the mixtures that serve to manufacture rubber parts.

2. Description of the Related Art

The rubber industry generates significant quantities of production and usage waste. The final shape and exploitation parameters for the products are obtained during the irreversible curing process. For that reason, the recycling of rubber objects requires costly operations, demanding considerable time and work.

Generally, recycled materials have inferior physical and mechanical properties and are not competitive relative to the raw materials of the original rubber. For that reason, rubber waste is a serious problem, both economically and ecologically.

The scale of this problem may be estimated based on the production of the rubber industry, which is about 35 million tons per year. More than 150 years ago, recycling tests were conducted on rubber waste. Today, after many years, the development of suitable technologies for its elimination remains a major problem in the rubber industry. From the perspective of environmental protection, the recycling of tires is extremely important because they represent 60-70% of the rubber industry's production.

Used tires can be burned (for example in cement works, pulp and paper mills, industrial boilers). They can also be shredded mechanically to obtain rubber, textile and scrap residues. Among these, rubber residues, depending on their granulometric size, are called reground rubber or granulates, reground rubber having an average diameter smaller than 2 mm, and granulates having an average diameter of 2 to 10 mm. Rubber granulates can in particular be used in athletic clothing, sound barrier materials, etc. Reground rubber can be used in road coatings, insulating concrete, etc. Rubber granulates has the advantage of having a high rubber content (according to the specifications, for example 98%). It is very advantageous to use rubber granulate, inasmuch as its sales price is low and it also has very few outlets on the market.

The pyrolysis of tires is one of the methods developed to process used tires. The products of pyrolysis are on the one hand high-temperature gases (above 600° C.), which are generally burned to recover the available energy, and on the other hand a solid residue with a high carbon content, which is either put in a dump or used as coal.

In certain recent processes, part of the pyrolysis gas is condensed to obtain pyrolytic oils that can serve as fuel or be mixed with diesel fuel. However, the solid residue is often contaminated by compounds (textiles, scrap, sand, mineral filler of the rubber), which reduces its value and calls the profitability of the process into question.

The pyrolysis of the rubber is done at high temperatures, in general much higher than 500° C., as in U.S. Pat. No. 4,588,477 or BE 820012. Pyrolysis at a reduced pressure makes it possible to reduce the pyrolysis temperature, as explained for example in US 2003/0079664 or U.S. Pat. No. 5,229,099. However, these rubber pyrolysis processes do not make it possible to obtain a solid residue that is directly usable. In fact, the solid residue obtained has the features of a non-active coal, which has a nonexistent reinforcing power when it is used as additive in rubber mixtures.

Pyrolysis methods exist carried out from rubber granulates as raw material. Thus, international application WO02/38658 describes a process for converting tire granulates through pyrolysis within a temperature range of 400 to 950° C., preferably from 500 to 750° C. However, although the process described uses rubber granulates, WO'658 does not specify that the pyrolysis is done in the presence of water. Thus, the solid residue obtained in WO092/38658 is not described as being directly exploitable in the rubber industry.

SUMMARY OF THE INVENTION

The inventors have surprisingly discovered that when the pyrolysis of rubber granulates is done under specific conditions, in particular at a low temperature and in the presence of water, all of the products resulting from the pyrolysis are directly exploitable, in particular in the rubber industry.

To the inventors' knowledge, only international application WO 2003/91359 mentions the exploitation of the solid residue resulting from the pyrolysis. This solid residue can be used as inactive component of the mixtures to manufacture rubber parts. However, this pyrolysis process uses tire waste and then results in products that are not very interesting in terms of exploitation, as the solid residue obtained is not pure enough to be used without prior purification in the rubber industry.

One of the aims of the present invention is to provide a process for converting rubber granulates.

According to a first aspect, the invention relates to a rubber granulate conversion process for producing a semi-active carbonized substance comprising the following steps:
a) pyrolyzing the rubber granulates at a temperature between 400 and 500° C. by introducing liquid water during the pyrolysis, to obtain a carbonized substance and a gaseous phase,
b) recovering the carbonized substance obtained during step a).

The process advantageously makes it possible to convert rubber granulates into directly exploitable products. "Exploitable" means that no purification (other than that indicated in this application, i.e. the separation of the gaseous phase) of the products obtained using the process according to the invention is necessary to be able to use them.

The term "pyrolysis" is used in its most traditional meaning, i.e. the chemical decomposition of the rubber granulates through action of the heat in an oxygen-deficient atmosphere. In practice, the introduction of oxygen, air, or any gas containing oxygen during the pyrolysis is minimized. The pyrolysis is not, however, necessarily done in an inert atmosphere (under nitrogen, argon, for example). It suffices simply to limit or prevent a contribution of air during the pyrolysis, to limit the contribution of oxygen.

"Rubber granulates" generally designates rubber fragments having a size from 2 mm to 10 mm, in particular from 3 mm to 9 mm, preferably from 4 mm to 8 mm, and a rubber purity generally greater than 95%, preferably greater than 98%. In particular, the rubber granulate used in the invention is free from iron particles. In general, the rubber granulate comes from the shredding of tires, rubber conveyor belts or rubber parts.

The process according to the invention is carried out by introducing liquid water during the pyrolysis. The process thus differs from the prior art processes where the heat vector during the pyrolysis is overheated steam. The water is introduced into the pyrolysis reactor in liquid form, at a temperature below 100° C. The temperature during the pyrolysis being comprised between 400 and 500° C., the water transforms into steam during the pyrolysis, this steam then being one of the components of the gaseous phase. The conversion of the liquid water into steam consumes thermal energy. In the context of the invention, the water is not introduced to supply the heat necessary for the pyrolysis.

The inventors have surprisingly discovered that introducing liquid water during the pyrolysis makes it possible to obtain better quality and directly exploitable pyrolysis products (carbonized substance, heavy oil). In particular, the process makes it possible to obtain a carbonized substance having the required properties, in particular having a reinforcing power that allows it to be used as additive in the rubber mixtures, in particular to prepare master batches for the rubber industry.

Without wishing to be bound by a particular theory, the introduction of liquid waterduring the pyrolysis makes it possible to:
cool the carbonized substance in the lower part of the pyrolysis reactor, which probably participates in obtaining a high-quality carbonized substance ("quenching" of the reaction),
perform the pyrolysis at a temperature below 500° C., which also probably participates in obtaining a good-quality carbonized substance and allows the process to consume less energy (economic advantage),
improve the evacuation of the gases and pyrolysis vapors outside the reactive medium. More specifically, the injected water, generally in the lower part of the pyrolysis reactor, vaporizes instantly and mixes with the pyrolysis gases, which prevents the formation of piles of rubber granulates "glued" in the upper part of the pyrolysis reactor by creating turbulence.

Preferably, in the above process, the weight percentage of water relative to the weight of rubber granulates in step a) varies from 5% to 20%, in particular from 7% to 17%, preferably from 10% to 15%.

The pyrolysis in step a) can be carried out at a temperature of 400 to 500° C., in particular from 425° C. to 495° C., still more prefer ably from 450° C. to 480° C.

The rubber granulate conversion process according to the invention is preferably done continuously.

The rubber granulate conversion process according to the invention, and in particular step a), is preferably done at atmospheric pressure, i.e. without implementing a reduced pressure or overpressure.

To perform the pyrolysis in step a), it is not necessary to add additives such as a catalyst and/or an organic solvent. Nevertheless, such modes are not excluded. In particular, the rubber granulates can comprise small amounts of materials in the form of traces (for example contaminants), which incidentally are recognized in the art as catalysts. According to one preferred embodiment, the only components introduced into the medium are the rubber granulates and water. This embodiment leads to a carbonized substance that is particularly suited to use in particular as reinforcing filler in the rubber mixtures.

In one embodiment, the aforementioned rubber granulate conversion process is conducted according to a cyclic mode in which all or part of the water present in the gaseous phase obtained in step a) is recovered and where the recovered water is reused in step a).

This embodiment has the advantage of making it possible to recycle the water. In practice, the water is introduced in liquid form during the pyrolysis. The water vaporizes and is components of the gaseous phase resulting from the pyrolysis. The water is then separated from the other components of the gaseous phase to be able to be recycled and reinjected into the pyrolysis reactor.

According to a second aspect, the invention also relates to the carbonized substance that can be obtained using the rubber granulate conversion process described above.

This carbonized substance has particular features and constitutes another object of the invention. This carbonized substance contains:
semi-active carbon black,
one or more metal oxides, comprising titanium dioxide or zinc oxide, and
sulfur.

More specifically, the carbonized substance according to the invention comprises, and generally consists of:
semi-active carbon black formed during the pyrolysis,
one or more metal oxides comprising titanium dioxide or zinc oxide, which are used as curing catalysts, and
sulfur resulting from the decomposition of the cysteine bridge of the rubber.

Generally, the carbonized substance according to the invention comprises:
from 80 to 95%, typically about 90%, of semi-active carbon black,
from 4 to 8%, typically about 6%, of titanium dioxide and/or zinc oxide, and
from 0.5 to 3%, typically from 1 to 2.8% of sulfur.

The percentages being expressed in weight percentages relative to the total weight of the carbonized substance.

The carbonized substance according to the invention generally includes a high ash content, in particular from 8 to 16%, preferably about 12%. "Ash" refers to the residue obtained after incineration of the carbonized substance (which primarily leads to the elimination of the carbon and sulfur). This ash is typically made up of metal oxides. About half of that ash is made up of titanium dioxide and/or zinc oxide.

Carbon black is an amorphous carbonaceous material, which assumes the form of spheres and aggregates of those spheres, the dimensions of the spheres generally being from 10 to 250 nm.

The carbon black present within the carbonized substance resulting from the process according to the invention is "semi-active" carbon black, within the meaning of standard ASTM D1765-00, in particular in light of its specific surface. "Carbonized substance comprising a semi-active carbon black" or "semi-active carbonized substance" refers to a carbonized substance that, once introduced into a rubber mixture before curing, behaves like a semi-active carbon black within the meaning of standard ASTM D1765-00.

In general, the carbonized substance according to the invention has a specific surface comprised between 25 and 40 $m^2/g$.

The carbonized substance according to the invention is directly exploitable in the channel, in particular as reinforcing filler to manufacture rubber mixtures.

The carbonized substance according to the invention also comprises titanium dioxide and/or zinc oxide. In fact, all of the titanium dioxide and/or zinc oxide that was found in the initial rubber granulates is found in the carbonized substance resulting from the pyrolysis reaction. The titanium dioxide and/or the zinc oxide is (are) the curing catalyst that was used to cure the rubber making up the granulates. Since the ZnO and/or $TiO_2$ oxide are curing catalysts commonly used during the preparation of rubber mixtures, when the carbonized substance according to the invention is used as reinforcing filler to manufacture rubber mixtures, it is not necessary to add additional zinc oxide and/or titanium dioxide, which is an advantage not only in terms of simplicity of use, but also inasmuch as these compounds are expensive.

The carbonized substance according to the invention also comprises sulfur. However, the sulfur is useful to cure the rubber parts. In fact, the sulfur makes it possible to perform the curing between the macromolecular chains of elastomers.

The carbonized substance according to the invention is therefore particularly suited for use as reinforcing filler to manufacture rubber mixtures.

"Reinforcing filler" refers to a filler that, added to a mixture, makes it possible, after curing that mixture, to obtain a vulcanizate having better mechanical strength and in particular, better resistance to breaking and abrasion.

In one embodiment of a first aspect, the process for converting rubber granulates into carbonized substance is conducted while also exploiting the gaseous phase produced during the pyrolysis. In this embodiment, the process also comprises the following steps:

c) separating, by distillation, the compounds of the gaseous phase obtained during step a) that have a boiling temperature above 300° C., through which a liquid composition, called heavy oil, is obtained, d) recovering the heavy oil obtained in step c).

In one specific embodiment, which is most often implemented (in particular for practical reasons), the process comprises the steps of:

c) separating, by distillation, the compounds of the gaseous phase obtained during step a) in the form of three fractions, i.e.

compounds with a boiling temperature above 300° C., through which a first liquid composition, called heavy oil, is obtained, compounds with a boiling temperature above the ambient temperature and below 300° C., through which a second liquid composition, called light oil, is obtained, compounds with a boiling temperature below the ambient temperature, through which a third liquid composition, called enriched gas, is obtained, d) recovering the heavy oil obtained in step c), e) potentially recovering the enriched gas and light oil obtained in step c).

In these embodiments, the exploitable carbonized substance and the exploitable heavy oil are advantageously produced jointly.

"Enriched gas" designates a mixture whereof the components have a boiling temperature below the ambient temperature and which is primarily made up of the following components: methane, butane, ethane, ethylene, propylene, $C_4$ hydrocarbons (in particular $C_4H_8$, $C_4H_{10}$), dihydrogen, nitrogen, dioxygen, carbon monoxide and dioxide, and water, the proportions of which vary depending on the operating parameters.

"Light oil" designates the liquid composition resulting from the gaseous phase, the components of which have a boiling temperature below about 300° C.

"Heavy oil" designates the liquid composition resulting from the gaseous phase, the components of which have a boiling temperature above about 300° C.

"Ambient temperature" refers to a temperature generally comprised between 5 and 35° C., in particular from 15 to 25° C.

The process according to the invention has the advantage of supplying products that are directly exploitable, in particular for the rubber industry.

The enriched gas and the light oil can be recovered. They may potentially be burned to supply thermal energy, for example to heat the pyrolysis reactor used to perform the pyrolysis.

According to a third aspect, the invention also relates to a heavy oil that can be obtained according to the aforementioned process.

The heavy oil preferably has a high flash point, typically above 210° C., for example between 210 and 300° C. (according to standard ISO 2 592), and one or more of the preferable features indicated in the table below.

TABLE 1

| Typical properties of the heavy oil | |
|---|---|
| Properties | Value range |
| Density at the temperature of 15° C., $kg/m^3$ | 700-1100, preferably 800-1000 |
| Sulfur content, % | 0.7-1.5, preferably 0.9-1.1 |
| Chlorine content, % | 0.005-0.1, preferably 0.01 to 0.06 |
| Mechanical impurity content, % | 0.1-0.2, preferably 0.13-0.15 |
| Water content, % | 2-15, preferably 5-11 |
| Emulsion content, % | 1-3, preferably 2.0 to 2.5 |
| Ignition point, ° C. | 30-50, preferably 34-40 |
| Kinematic viscosity at 40° C., $mm^2/s$ | 7-13, preferably 9-11 |
| Acid value, mg KOH/g | 3-6, preferably 4-5 |
| Incineration residue, % | 0.01-0.05, preferably 0.02-0.04 |
| Carbonization residue, % | 1-3, preferably 1.9-2.1 |

The heavy oil obtained using the process according to the invention can be used as plasticizer, in particular to manufacture rubber parts. It should be noted that the heavy oil obtained using the process corresponds to a plasticizer with a low Polycyclic Aromatic Hydrocarbon (PAH) content, which is particularly suited to the recent evolutions in the laws in the area.

Plasticizers are used to facilitate the implementation of the elastomer mixtures during the manufacture thereof, in particular by improving the viscosity and flow properties. They also contribute to the mechanical properties of the elastomer after curing.

According to a fourth aspect, the invention also relates to a composition comprising:
the carbonized substance as defined above,
at least one elastomer,
potentially heavy oil as defined above.

The invention relates to a composition comprising:
the carbonized substance as defined above,
at least one elastomer.

The invention relates to a composition comprising:
the carbonized substance as defined above,
at least one elastomer,
heavy oil as defined above.

These compositions are useful to manufacture master batches for the rubber industry.

"Master batch" refers to a mixture that can be used as such or as a component in the final formulation to manufacture rubber parts through curing.

"Elastomer" refers to all types of synthetic rubber and natural rubber. The elastomers used are preferably the natural rubber resulting from the HEVEA and/or the SBR copolymer of Styrene and Butadiene.

As indicated above, the carbonized substance according to the invention includes sulfur that is generally in a sufficient quantity to perform the curing of the rubber. It should, however, be noted that during the pyrolysis, part of the sulfur initially contained in the rubber granulates is eliminated in the gaseous phase in the form of different volatile organic molecules and only a more or less significant part of the sulfur is in the carbonized substance. In most cases, the carbonized substance includes enough sulfur to perform the curing. In the more rare cases where the sulfur content obtained is insufficient, it may be completed as needed by adding sulfur, in particular of ventilated triturated quality, just before the curing.

In the master batches using the carbonized substance according to the invention, it is advantageous according to a technique known in itself to add stearic acid, which serves as curing activator. It is also possible to add sulfur and/or zinc oxide or titanium dioxide.

In one preferred embodiment, the master batch-type composition according to the invention comprises:
  50 to 150 parts by weight of carbonized substance,
  80 to 120 parts by weight of at least one elastomer, and
  possibly 25 to 75 parts by weight of heavy oil.

In one particularly preferred embodiment, the composition of the master batch type according to the invention comprises:
  50 to 150 parts by weight of carbonized substance,
  about 100 parts by weight of at least one elastomer.

In another particularly preferred embodiment, the composition of the master batch type according to the invention comprises:
  50 to 150 parts by weight of carbonized substance,
  about 100 parts by weight of at least one elastomer, and
  25 to 75 parts by weight of heavy oil.

The elastomer can for example be of the SBR series 1500 or series 1700 type.

The invention also relates to the use of the aforementioned carbonized substance, the aforementioned heavy oil or the aforementioned composition for preparing a master batch.

According to a fifth aspect, the invention also relates to facilities adapted to the conversion of rubber granulates according to the processes defined above.

The invention relates to a facility for the conversion of rubber granulates into carbonized substance, comprising a pyrolysis reactor provided with external heating means making it possible to heat said reactor to a temperature of 400 to 500° C., comprising:
  a first inlet provided with means for introducing rubber granulates,
  a second inlet provided with means for introducing liquid water situated downstream of the first inlet,
  a first outlet provided with means for discharging the solid products of the pyrolysis associated with means for recovering solid products of the pyrolysis, and
  a second outlet provided with means for discharging the gaseous phase produced during the pyrolysis.

"Pyrolysis reactor" refers to the closed medium in which the pyrolysis is done. The pyrolysis reactor is preferably vertical, so that the second inlet provided with means for introducing liquid water is situated lower than the first inlet provided with means for introducing rubber granulates. Thus, the rubber granulate is converted in particular into carbonized substance during the pyrolysis, and the carbonized material descends along the reactor as far as the second inlet of the pyrolysis reactor where the liquid water arrives and "quenches" the pyrolysis reaction.

The pyrolysis reactor is provided with external heating means. The heat does not come from the products introduced into the reactor (rubber granulates and water).

The pyrolysis reactor is heated by external heating, which makes it possible to reach the pyrolysis temperature. The pyrolysis reactor generally includes a central shaft, which is generally also heated. Preferably, the central shaft is provided with stirring blades.

In one particular embodiment, the heating of the external heating system comes at least in part from the combustion of the enriched gas and/or the light oil obtained using the process according to the invention.

Advantageously, the means for introducing the rubber granulates with which the first inlet of the pyrolysis reactor is provided comprise means for introducing water jointly with the introduction of the rubber granulates (the introduced rubber granulates are "wetted"). "Joint introduction" means that the rubber granulates are introduced with the water. Typically, the means for introducing rubber granulates comprise a tubular part containing an inclined worm screw that makes it possible to bring the water/granulate mixture toward the first inlet.

The pyrolysis reactor comprises a second inlet provided with means for introducing liquid water. Generally, the majority of the water is introduced through this second inlet.

The water is therefore introduced through two inlets into the pyrolysis reactor: on the one hand through the first inlet and jointly with the rubber granulates, which are introduced into the pyrolysis reactor while being wetted, on the other hand through the second inlet dedicated to water.

The pyrolysis reactor is free of specific inlet and/or outlet means for the overheated steam. In fact, the water is introduced into the pyrolysis reactor in liquid form. During the pyrolysis, the water, which is converted into steam under the effect of the heat, is eliminated in the gaseous phase, and the steam is therefore discharged by the means for discharging the gaseous phase.

In one embodiment, in the aforementioned facility, the means for introducing rubber granulates with which the first inlet of the pyrolysis reactor is provided comprise a device for premixing the granulates and water making it possible to obtain a pre-mixture of water and rubber granulates substantially free from air.

In one particular embodiment, in the aforementioned facility, the means for introducing rubber granulates with which the first inlet of the pyrolysis reactor is provided comprise a device for premixing the granulates and water making it possible to obtain a pre-mixture free of air.

The premixing device can in particular be a conical tray that includes rubber granulates and water and whereof the lower end is connected to the inclined worm screw that supplies the pyrolysis reactor with granulates and water, as illustrated in FIG. 2.

This device advantageously makes it possible to prevent the entry of air, and therefore of oxygen, into the pyrolysis reactor, which makes it possible to perform the pyrolysis in an oxygen-deficient atmosphere.

In another embodiment, the aforementioned facility is adapted to convert rubber granulates into carbonized substance with the joint production of heavy oil, and also comprises a fractionating tower in fluid communication with the discharge means of the gaseous phase, said fractionating tower being able to separate the compounds of said gaseous phase that have a boiling temperature below 300° C. and where said fractionating tower comprises an outlet provided with means for recovering said heavy oil.

In this embodiment, the gaseous phase leaving the pyrolysis reactor is oriented toward a fractionating tower.

The fractionating tower thus makes it possible to separate the heavy oil from the other components of the gaseous phase.

In one preferred embodiment, the fractionating tower is able to separate:
- the compounds of said gaseous phase that have a boiling temperature above 300° C., through which a first liquid composition, called heavy oil, is obtained,
- the compounds of said gaseous phase that have a boiling temperature above the ambient temperature and below 300° C., through which a second liquid composition, called light oil, is obtained,
- the compounds of said gaseous phase that have a boiling temperature below the ambient temperature, through which a gaseous composition, called enriched gas, is obtained, and said fractionating tower comprising a first outlet provided with means for recovering said heavy oil, a second outlet provided with means for recovering said light oil, a third outlet provided with means for recovering said enriched gas.

In this embodiment, the fractionating tower makes it possible to separate the components of the gaseous phase and isolate three phases: the enriched gas at the head of the tower, the light oil at the middle of the tower and the heavy oil at the bottom of the tower. The enriched gas, light oil and heavy oil can be stored before use in storage reservoirs.

In one preferred embodiment, the facility includes a water cooler in fluid communication with the enriched gas, said water cooler being able to separate the water from the other components of the enriched gas.

In one particularly preferred embodiment, the facility also includes means for recovering water in liquid form and means for reinjecting the recovered water into the pyrolysis reactor.

This embodiment advantageously makes it possible to recycle the water. The water is therefore introduced into the pyrolysis pyrolysis, in which it is converted into steam. This steam escapes from the reactor with the gaseous phase. After separation of the gaseous phase in the fractionating tower, the steam is one of the components of the enriched gas. The water cooler makes it possible to condense the water and separate the water from the other components of the enriched gas. The water is then returned to the pyrolysis reactor by the water recycler.

"Fractionating tower" refers to a separating unit that makes it possible to separate the components contained in the gaseous phase by distillation.

The facility according to the invention has the advantage of being self-sufficient in terms of energy, i.e. it makes it possible to produce at least as much energy as the energy needed to power it (in particular to heat the pyrolysis enclosure).

BRIEF DESCRIPTION OF THE DRAWING FIGURES

Different interesting features and embodiments of the facility are illustrated below in reference to the appended figures, in which:

FIGS. 1 and 2 are illustrations of a facility according to the invention,

FIG. 3 is a cross-sectional view of the device implemented to produce the examples below.

DETAILED DESCRIPTION OF THE INVENTION

FIG. 1 shows a facility including:
a pyrolysis reactor 10, provided with external heating means 20, and which includes:
- a first inlet 30 provided with means for inserting rubber granulates 40,
- a second inlet 50 provided with means for introducing water in liquid state 60 situated downstream of said first inlet,
- a first outlet 70 provided with means for discharging solid products of the pyrolysis 80 associated with means for recovering solid products of the pyrolysis 90,
- a second outlet 100 provided with means for discharging the gaseous phase produced during the pyrolysis 110.

The external heating means 20 make it possible to heat the reactor 10 to a temperature of 400 to 500° C.

The wet granulates are introduced through the first inlet 30 of the reactor and the water is introduced through the second inlet 50 of the reactor. The second inlet 50 provided with water introduction means is situated downstream from (lower than) the first inlet 30 provided with means for introducing granulates: the rubber granulates undergo the pyrolysis reaction and turn into carbonized substances by moving toward the bottom of the reactor. The pyrolysis reaction is then "quenched" by the arrival of the liquid water arriving through the second inlet.

The pyrolysis is done in the pyrolysis reactor.

The gaseous phase produced during the pyrolysis is discharged from the reactor through the second outlet 90, and the solid products (carbonized substances are discharged from the reactor through the first outlet 70, to ultimately be recovered in the means for recovering the solid products of the pyrolysis 90, for example a storage reservoir for solid products of the pyrolysis.

FIG. 2 shows a facility (in cross-section) comprising a pyrolysis reactor 10, provided with external heating means 20, which includes:
a first inlet 30 provided with means for introducing rubber granulates 40 comprising:
- a tubular part 120 containing an inclined worm screw 130, and
- a device for pre-mixing granulates and water 140, in particular a conical tray 150, and a lower end of which is connected to the tubular part 120,
a second inlet 50 provided with means for introducing water in liquid state 60 situated downstream from said first inlet,
a first outlet 70 provided with means for discharging solid products of the pyrolysis 80 associated with means for recovering the solid products of the pyrolysis 90,
a second outlet 100 provided with means for discharging the gaseous phase produced during the pyrolysis 110,
a central shaft 160, provided with stirring blades 170.

The tubular part 120 containing the inclined worm screw 130 brings the water/granulate mixture toward the first inlet 30.

The device for pre-mixing the granulates and water 140 includes rubber granulates and water making it possible to obtain a pre-mixture of water and rubber granulates substantially free from air.

FIG. 3 shows a facility (in cross section) comprising:
a storage tub 180 connected to the pyrolysis enclosure 10,
a pyrolysis reactor 10, provided with external heating means 20, and comprising:
- a first inlet 30 provided with means for introducing rubber granulates 40,
- a second inlet 50 provided with means for introducing water in liquid state 60 situated downstream from said first inlet 30, a first outlet 70 provided with means for discharging solid products of the pyrolysis 80 associated with means for recovering the solid products of the pyrolysis 90, and a second outlet 100 provided with means for discharging the gaseous phase produced during the pyrolysis 110, a fractionating tower 190, in fluid communication with the means for discharging the gaseous phase produced during the pyrolysis of the rubber granulates 110 at the second outlet 100 of the pyrolysis enclosure, and said fractionating tower 190 comprising:

a first outlet 200 provided with means for recovering said heavy oil 210, in particular a reservoir for storing heavy oil, a second outlet 220 provided with means for recovering said light oil 230, in particular a reservoir for storing the light oils, a third outlet 240, means for recovering the water in liquid form, in particular:

a water cooler 250 in fluid communication with the head of the fractionating tower 190 by the third outlet 240, and provided with means for recovering the enriched gas 260, in particular a storage reservoir for enriched gas, a water recycler 270, and means for reinjecting recovered water into the pyrolysis enclosure 280.

The storage tub 180 contains rubber granulates and water.

The water cooler 250 cools the enriched gas coming from the head of the fractionating tower 190.

The fractionating tower 190 separates the compounds of the gaseous phase coming from the pyrolysis into three phases:

the compounds of said gaseous phase that have a boiling temperature above 300° C., through which a first liquid composition, called heavy oil, is obtained, this heavy oil being discharged from the fractionating tower through the first outlet 200, the compounds of said gaseous phase that have a boiling temperature above the ambient temperature and below 300° C., through which a second liquid composition, called light oil, is obtained, this light oil being discharged from the fractionating tower through the second outlet 220, the compounds of said gaseous phase that have a boiling temperature below the ambient temperature, through which a gaseous composition, called enriched gas, is obtained, this enriched gas being discharged from the fractionating tower through the third outlet 240.

The water recycler 270 recycles the water from the enriched gas toward the pyrolysis reactor 10.

EXAMPLES

Example 1

2 kg/h of rubber granulates (granulates from 1.0 to 4.0 mm (textile %:<1.5%–35 sand: 1%–metal<0.1%)–ABC RECYCLING®) and 0.25 liter of water/hour are introduced into a pyrolysis reactor heated to 495° C. 0.8 kg of carbonized substance are recovered per hour. The gaseous phase formed during the pyrolysis is separated into enriched gas (0.3 kg/h), heavy oil (0.5 kg/h) and light oil (0.4 kg/h).

Table 2 shows the characteristics of the semi-active carbonized substance obtained compared to the characteristics of the N-330® soot characterized according to an ASTM standard giving it the quality of a semi-active carbon black.

TABLE 2

Comparison of the N-330 ® soot and the carbonized substance obtained

| SOOT TESTS | STANDARD | N-330 ® | Semi-active carbonized substance |
|---|---|---|---|
| Iodine number [g/kg] | ASTM D 1510 | 82.6 | 105.7 |
| Absorption (dibutyl phthalate DBP), [cm$^3$/100 g] | ASTM D 2414 | 101.7 | — |
| Adsorption (Cetyl trimethylammonium bromide CTAB), [m$^2$/g] | ASTM D 3765 | 81.7 | 84.7 |
| Tinting strength, [%] | ASTM D 3265 | 102.1 | 59.2 |
| Weight loss during drying at 125° C., [%] | ASTM D 1509 | 0.15 | 0.75 |
| Ash content, [%] | ASTM D 1506 | 0.31 | 12.0 |
| Sulfur content, [%] | ASTM D 1619 | 0.39 | 2.43 |

One can see that the carbonized substance obtained includes significant content levels in terms of exploitable material.

The carbonized substance according to the invention has a high ash content: 12%, nearly half of which is made up of zinc oxide (ZnO) (table 3). The carbonized substance according to the invention also contains a significant quantity of sulfur.

TABLE 3

Composition of the ash obtained by incineration of the carbonizing substance according to the invention

| Component | Content [%] |
|---|---|
| $Na_2O$ | 0.486602 |
| $Li_2O$ | 0.001213 |
| $K_2O$ | 0.175399 |
| ZnO | 49.61224 |
| $Fe_2O_3$ | 1.34167 |
| $As_2O_3$ | 0.00225 |
| $CrO_3$ | 0.032389 |
| CdO | 0.000218 |
| PbO | 0.022657 |
| CoO | 0.182031 |
| NiO | 0.009114 |
| CuO | 0.088711 |
| HgO | 6.55E−05 |
| $SiO_2$ | 29.9 |
| CaO | 6.124958 |
| MgO | 4.129356 |
| $Al_2O_3$ | 2.886896 |

Table 4 groups together the technical characteristics of two batches of heavy oil obtained using the process according to the invention.

TABLE 4

Technical characteristics of two batches of heavy oil obtained using the process according to the invention

| No. | Characteristic | Test 1 | Test 2 |
|---|---|---|---|
| 1. | Density at the temperature of 15° C., kg/m$^3$ | 917.2 | 920.5 |
| 2. | Sulfur content, % | 1.36 | 1.73 |
| 3. | Kinematic viscosity at 40° C., mm$^2$/s (measured for a glass capillary viscosimeter) | 63.8 (80° C.) | 29.6 (90° C.) |
| 4. | Stalling point, ° C. | 10 | 28 |

Example 2

The carbonized substance obtained in example 1 was used as reinforcing filler to manufacture rubber mixtures. More specifically, in the mixture, 50% of N-330® soot used by the rubbers as reinforcing filler was replaced by carbonizing substance.

Table 5 details, as a comparison, the composition of mixtures 1 and 2, mixture 1 (control) also comprising as reinforcing filler 100% N-330® soot and mixture 2 also comprising as reinforcing filler a mixture of 50% N-330® soot/50% carbonizing substance of example 1.

TABLE 5

Composition of mixtures 1 and 2

| RAW MATERIAL | Mixture 1 | Mixture 2 |
| --- | --- | --- |
| Synthetic rubber (KER ® N-29 from Synthos Dwory ®) | 53.1 | 53.1 |
| Synthetic rubber (KER ® 8512 Synthos Dwory ®) | 7.7 | 7.7 |
| N-330 ® soot (Bydgoskie Zaklady Przemyslu Gumowego "STOMIL" S.A.) | 22.4 | 11.2 |
| N-539 ® soot (Bydgoskie Zaklady Przemyslu Gumowego "STOMIL" S.A.) | 4.4 | 4.4 |
| Carbonizing substance obtained in example 1 | — | 11.2 |
| Zinc oxide (zinc white) | 3.1 | 2.4 |
| Stearic acid | 0.8 | 0.8 |
| TMTD (tetramethylthiurame disulfide) accelerator | 0.1 | 0.1 |
| CBS (n-cyclohexyl-2-benzothiazole sulfonamide) accelerator | 1.3 | 1.3 |
| Powdered sulfur | 0.7 | 0.7 |
| Colophane | 0.4 | 0.4 |
| Nytex ® oil (plasticizer) | 6 | 6 |
| Kaolin | — | 0.7 |

Table 6 groups together the physical and mechanical properties of the mixtures of rubber obtained after curing.

TABLE 6

Results of the physical and mechanical tests on mixtures 1 (control) and 2

| Type of test | Mixture 1 (control) | Mixture 2 |
| --- | --- | --- |
| Hardness (+−5) [° Sh] (measured by a shore A dynamic hardness tester ASTM D 2240) | 70 | 67 |
| Specific weight [tons/m$^3$] or density | 1.10 | 1.11 |
| Abrasiveness [mm$^3$] (according to standard DIN 53 516 and NFT 46 012 under load of 1 daN) | 111 | 124 |
| Tear strength [kN/m] (notched angular test tubes (Standard NFT 46-007) | 10.7 | 11.3 |
| Tensile strength [MPa] (According to standard NF T46002 (300% module)) | 19.4 | 20.5 |
| Relative elongation relative to the initial length of the test tube) or strain at failure [%] | 547 | 700 |

The rubber mixture comprising 50% N-330® soot and 50% carbonized substance as reinforcing filler has properties similar to the rubber mixture obtained from a master batch comprising 100% N-330® soot. The substitution of carbonizing substance for all or part of the N-330® soot is very interesting from the economic standpoint, because N-330® soot is an expensive product.

The invention claimed is:

1. A process for converting rubber granulates into a carbonized substance comprising the following steps:
   a) introducing liquid water and rubber granulates into a pyrolysis reactor, a weight of the water relative to a weight percentage of rubber granulates being from 5% to 10%, and pyrolyzing the rubber granulates at atmospheric pressure at a temperature between 400 and 500° C., said temperature being obtained by heating the pyrolysis reactor with external heating through which carbonized substance and a gaseous phase are obtained; and
   b) recovering the carbonized substance obtained during step a),
   wherein the conversion process is carried out as a continuous process.

2. The process according to claim 1, also comprising the following steps:
   c) separating, by distillation, the compounds of the gaseous phase obtained during step a) that have a boiling temperature above 300° C., through which a liquid composition, called heavy oil, is obtained; and
   d) recovering the heavy oil obtained in step c).

3. The rubber granulate conversion process according to claim 1, conducted according to a cyclic mode in which all or part of the water present in the gaseous phase obtained in step a) is recovered and where the recovered water is reused in step a).

4. The process according to claim 1, wherein the temperature is from 425 to 495° C.

5. The process according to claim 1, wherein the temperature is from 450 to 480° C.

6. The process according to claim 1, wherein the carbonized substance contains:
   80 to 95% of semiactive carbon black;
   4 to 8% of at least one of titanium dioxide or zinc oxide;
   0.5 to 3% of sulfur; and
   8 to 16% ash.

7. The process according to claim 6, wherein the carbon black is amorphous and comprises spheres and aggregations of the spheres, with dimensions of the spheres being from 10 to 250 nm.

8. The process according to claim 1, wherein the carbonized substance has a specific surface of between 25 to 40 m$^2$/g.

9. The process according to claim 2, wherein the heavy oil has components with a boiling point above about 300° C.

10. The process according to claim 2, wherein the heavy oil has a flashpoint above 210° C.

11. The process according to claim 2, wherein the heavy oil has a density at 15° C. of 700-1100 kg/m$^2$.

12. The process according to claim 2, wherein the heavy oil has a density at 15° C. of 800-1000 kg/m$^2$.

13. The process according to claim 1, wherein the rubber granulates have a size of from 2 mm to 10 mm.

* * * * *